US011194032B2

(12) United States Patent
Cetinoneri et al.

(10) Patent No.: US 11,194,032 B2
(45) Date of Patent: Dec. 7, 2021

(54) SYSTEMS AND METHODS FOR OBJECT DETECTION BY RADIO FREQUENCY SYSTEMS

(71) Applicant: Apple Inc., Cupertino, CA (US)

(72) Inventors: Berke Cetinoneri, Santa Clara, CA (US); Ioannis Sarkas, Redwood City, CA (US); Qishan Yu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 291 days.

(21) Appl. No.: 16/362,124

(22) Filed: Mar. 22, 2019

(65) Prior Publication Data
US 2020/0300996 A1 Sep. 24, 2020

(51) Int. Cl.
*G01S 13/04* (2006.01)
*G01S 7/03* (2006.01)
*G01S 7/02* (2006.01)
*G01S 13/00* (2006.01)

(52) U.S. Cl.
CPC .............. *G01S 13/04* (2013.01); *G01S 7/024* (2013.01); *G01S 7/03* (2013.01); *G01S 13/003* (2013.01)

(58) Field of Classification Search
CPC ........ G01S 13/04; G01S 13/003; G01S 7/024; G01S 7/025; G01S 7/026; G01S 7/03; G01S 7/2922; G01S 7/2927
USPC .............................. 342/27, 189, 205, 92, 175
See application file for complete search history.

(56) References Cited

U.S. PATENT DOCUMENTS

| | | | | |
|---|---|---|---|---|
| 9,316,726 | B2* | 4/2016 | Leskosek | G01S 13/04 |
| 9,813,997 | B2* | 11/2017 | Mercer | H04W 52/367 |
| 10,097,715 | B2* | 10/2018 | Park | H04N 1/00896 |
| 10,291,056 | B2* | 5/2019 | Bell | G06T 7/60 |
| 2007/0222663 | A1* | 9/2007 | Humphrey | G01S 13/04 342/28 |
| 2012/0274498 | A1 | 11/2012 | Hyde et al. | |
| 2014/0315592 | A1* | 10/2014 | Schlub | H04B 1/3838 455/522 |
| 2015/0029052 | A1* | 1/2015 | Leskosek | G01S 13/04 342/27 |

(Continued)

OTHER PUBLICATIONS

Sophia Antipolis Cedex, Study on new radio access technology (3GPP TR 38.912 version 14.1.0 Release 14), 78 Pages.

(Continued)

*Primary Examiner* — Erin F Heard
*Assistant Examiner* — Michael W Justice
(74) *Attorney, Agent, or Firm* — Fletcher Yoder PC

(57) ABSTRACT

Systems, methods, and devices are provided for detecting the presence of an object near an electronic device. A radio frequency (RF) system of an electronic device may include a first circuit that includes one or more transmission paths for transmitting a reference signal external to the electronic device. The RF system may include a second circuit that includes one or more receiving paths for receiving a reflection signal based on the reference signal. The RF system may also include a processor that may instruct the RF system to perform a comparison between the reference signal and the reflection signal, determine whether the object is in proximity based at least in part on whether comparison results exceed a comparison threshold, and decrease power output by the RF system below the comparison threshold.

20 Claims, 7 Drawing Sheets

(56) References Cited

U.S. PATENT DOCUMENTS

| | | | | |
|---|---|---|---|---|
| 2015/0201385 A1* | 7/2015 | Mercer | ............... | H04B 17/318 |
| | | | | 455/452.1 |
| 2017/0077764 A1* | 3/2017 | Bell | ................ | H02J 7/027 |
| 2017/0195508 A1* | 7/2017 | Park | ................ | H04N 1/4406 |
| 2018/0292521 A1* | 10/2018 | Saitou | ................ | G08B 25/10 |
| 2018/0331730 A1 | 11/2018 | Sanderovich et al. | | |
| 2018/0348339 A1* | 12/2018 | Lien | ................ | G01S 7/023 |
| 2019/0033116 A1* | 1/2019 | Hoferer | ................ | G01S 7/2927 |
| 2019/0377075 A1* | 12/2019 | Tsfati | ................ | G01S 13/04 |
| 2020/0166623 A1* | 5/2020 | Sahin | ................ | G01S 13/04 |

OTHER PUBLICATIONS

Martin Hitzler et al., On Monostatic and Bistatic System Concepts for mm-Wave Radar MMICs, IEEE Transactions on Microwave Theory and Techniques, vol. 66, No. 9, Sep. 2018, 12 Pages.

\* cited by examiner

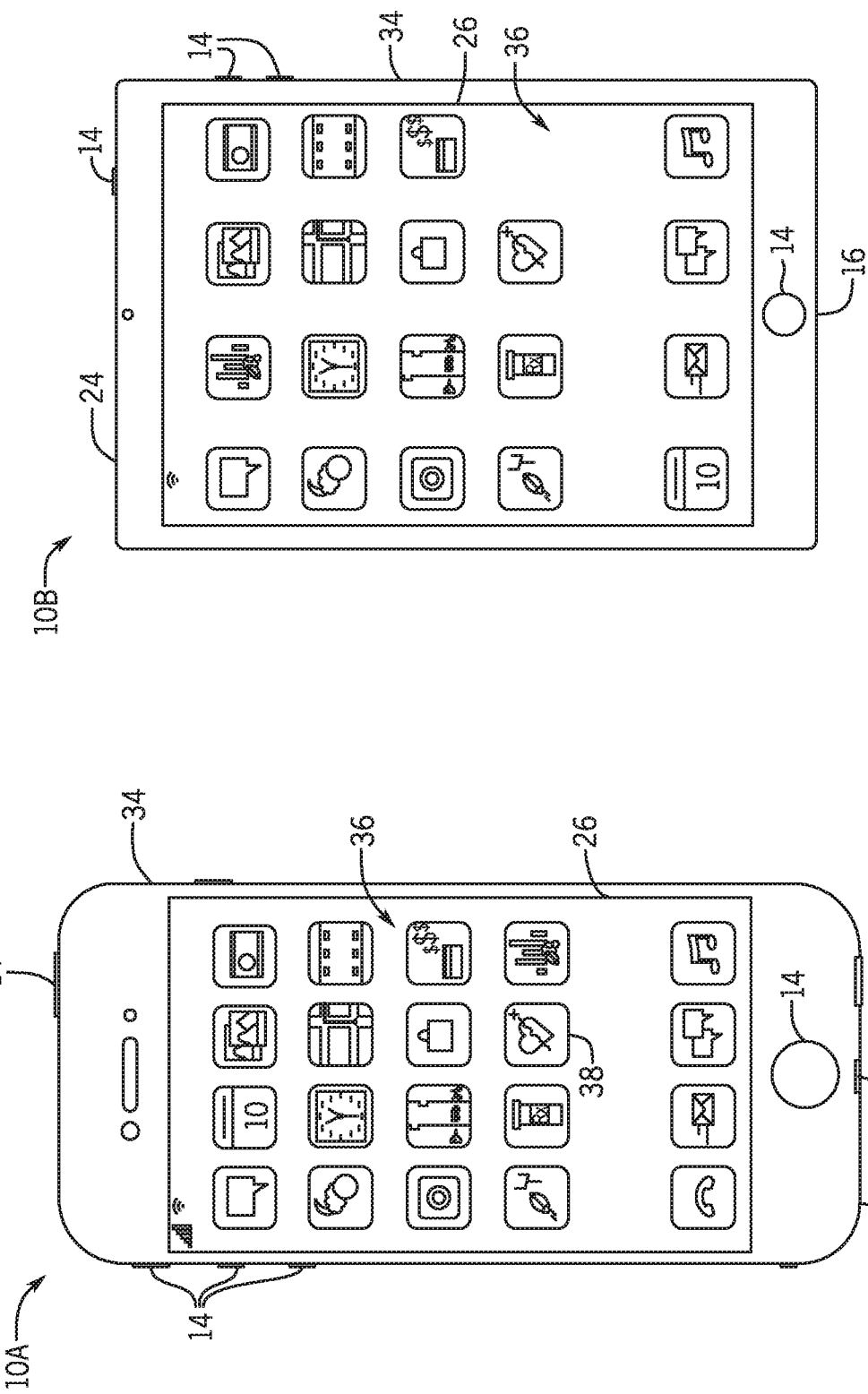

SYSTEMS AND METHODS FOR OBJECT DETECTION BY RADIO FREQUENCY SYSTEMS

BACKGROUND

The present disclosure relates generally to radio frequency systems and, more particularly, to using the radio frequency system to detect nearby objects and adjusting system operations to comply with energy absorption (e.g., specific absorption rate (SAR), maximum permissible exposure (MPE)) specifications when the object is detected by the radio frequency system.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as smartphones and laptops, often include a radio frequency system to facilitate wireless communication of data with other electronic devices and/or networks. To facilitate the wireless communication, the radio frequency system may emit energy in the form of radio waves. In some cases, the emitted energy may be absorbed by an object (e.g., a human body) that is within proximity to the radio frequency system. The allowable amount of energy that may be absorbed by such an object may be regulated, and to ensure that these absorption specifications are met, the radio frequency system may lower energy (e.g., power) output when the object is nearby. However, traditional radio frequency systems may be incapable of detecting the presence of an object and thus, must output lower than maximum energy during all times of operation. Operating at a lower than maximum energy output may result in performance inefficiency of the radio frequency system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to adjusting radio frequency system operations when an object (e.g., a human body) is within proximity by using existing radio frequency system hardware as a radar to detect the presence of an object and modifying energy (e.g., power) output by the radio frequency system accordingly. Radio frequency systems of electronic devices may employ 5G New Radio (NR) millimeter-wave (mmWave) technology and/or one of sub-6 GHz technologies (e.g., 4G LTE, 5G NR sub-6 GHz, non-mmWave technologies, and the like). Such radio frequency systems must comply with regulations (e.g., maximum permissible exposure (MPE) or specific absorption rate (SAR), respectively) on the rate at which energy carried by wireless signals are absorbed by the human body. To comply with the MPE or the SAR depending on the radio frequency technology implemented, the radio frequency system may output lower than maximum output power when the human body is near the radio frequency system. However, in many cases, the radio frequency system may be incapable of detecting the presence of the nearby human body and thus, must output lower than maximum output power at nearly all operation times. In such instances, the performance and operational efficiency of the radio frequency system may be reduced.

To ensure compliance with the MPE or SAR while avoiding compromises on the radio frequency system performance, in some embodiments, existing radio frequency hardware may be implemented to detect the presence of the nearby human body, and the output of the radio frequency system may be adjusted accordingly. In some embodiments, the hardware may be implemented as a bi-static radar with multiple transmitting/receiving circuits (e.g., quads). A first quad of the bi-static radar may transmit a 5G NR signal of a first polarization to an external environment. A second quad of the bi-static radar may receive a reflection of the transmitted 5G NR signal using a second polarization. The reflected 5G NR signal, for example, may be generated when the transmitted 5G NR signal is reflected off the human body. The radio frequency system may perform a comparison between the transmitted 5G NR signal and the reflected 5G NR signal to determine whether the human body is within proximity to the device. In this example, based on the comparison, the radio frequency system may adjust its output power to meet the MPE. In some embodiments, when the sub-6 GHz technology is used, the radio frequency system may adjust its output power to meet the SAR.

In some embodiments, the hardware may be implemented as a mono-static radar. For example, the mono-static radar may transmit the 5G NR signal and receive the reflected 5G NR signal using a single transmitting/receiving quad and polarization. The mono-static radar may use circuit components, such as bi-directional couplers and envelope detectors, to facilitate transmitting and receiving the 5G NR signal using the single quad. Further, the radio frequency system may perform a comparison between the transmitted 5G NR signal and the reflected 5G NR signal to determine whether the human body is within proximity to the device. Based on the comparison, the radio frequency system may adjust its output power to meet the MPE. In some embodiments, when the sub-6 GHz technology is used, the radio frequency system may adjust its output power to meet the SAR.

Further, in some embodiments, the hardware may be implemented as a Body Detection Sensor operating in the 24 giga-hertz (GHz) band. In particular, multiple transmitting/receiving quads or a single transmitting/receiving quad may be used to detect the presence of the human body, in a manner similar to that of the bi-static and mono-static radars, respectively. For example, the first quad may use the existing 24 GHz band to transmit a chirp (e.g., non-5G NR impulse response) signal of a first polarization, and the second quad may receive the reflected chirp signal using a second polarization. As another example, a single quad may transmit the chirp signal and may receive a reflection of the chirp signal using a single polarity. The radio frequency system may perform a comparison between the transmitted chirp signal and the reflected chirp signal to determine whether the human body is within proximity to the device. Based on the comparison, the radio frequency system may adjust its output power to meet the MPE. In some embodiments, when the sub-6 GHz technology is used, the radio frequency system may adjust its output power to meet the SAR.

BRIEF DESCRIPTION OF THE DRAWINGS

Various aspects of this disclosure may be better understood upon reading the following detailed description and upon reference to the drawings in which:

FIG. 2 is a front view of a hand-held device representing an example of the electronic device of FIG. 1, in accordance with an embodiment;

FIG. 3 is a front view of another hand-held device representing another example of the electronic device of FIG. 1, in accordance with an embodiment;

DETAILED DESCRIPTION OF SPECIFIC EMBODIMENTS

Figure 1:
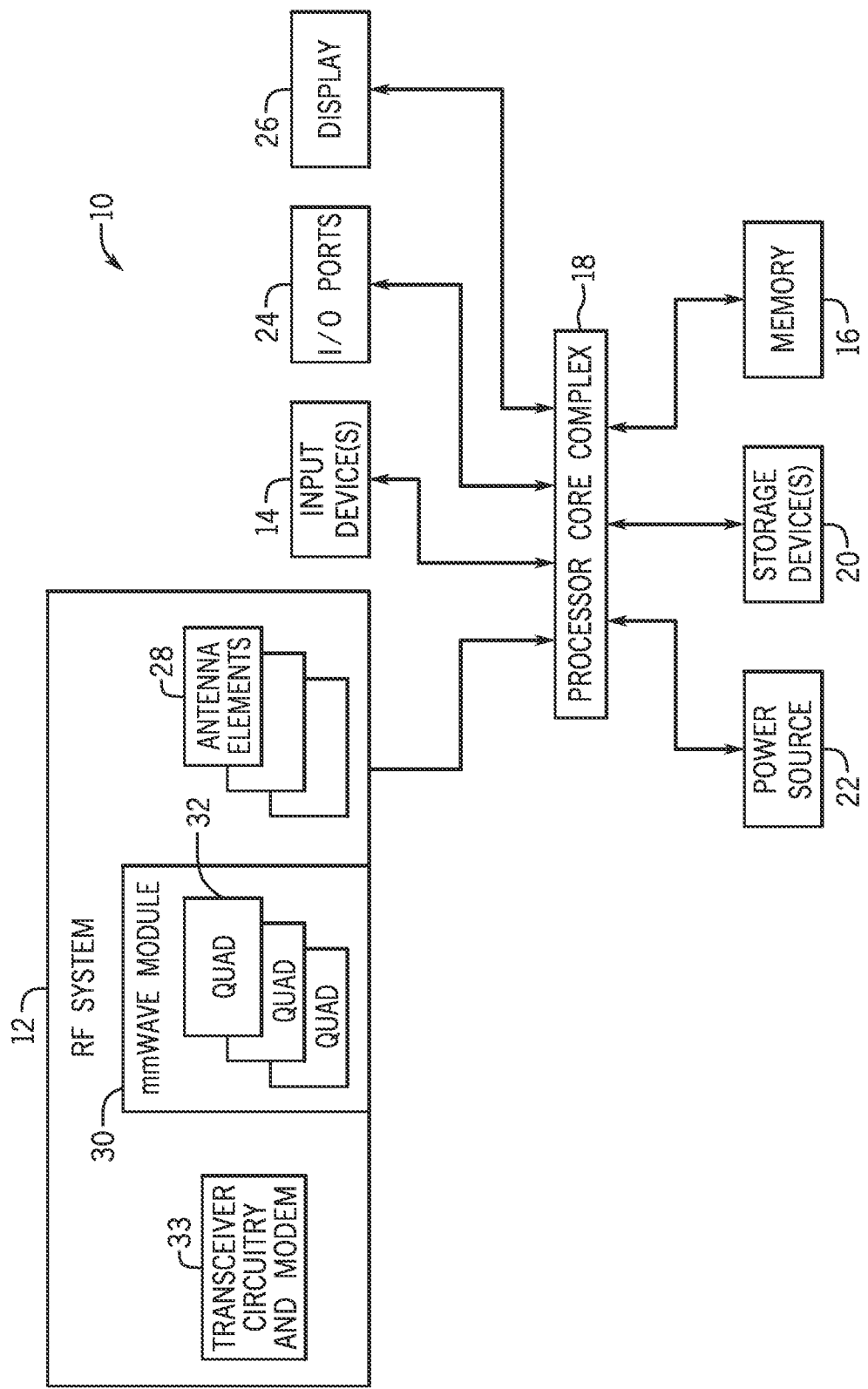
FIG. 1 is a block diagram of an electronic device with a radio frequency system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to radio frequency systems used to facilitate wireless communication of data between electronic devices and/or with a network. For example, the radio frequency system may wirelessly communicate data by transmitting wireless signals (e.g., radio waves) modulated in a manner representative of the data, for example, via a personal area network (e.g., Bluetooth network), a local area network (e.g., an 802.11x Wi-Fi network), and/or a wide area network (e.g., a 4G, 5G, or LTE cellular network).

In particular, the radio frequency system may implement millimeter-wave (mmWave) wireless communication technologies due to large amounts of available bandwidth in millimeter frequency bands that are capable of supporting high rates of information transfer. As an example, the radio frequency system may use Fifth-Generation New Radio millimeter-wave (e.g., 5G NR mmWave) wireless technology or 5G NR Sub-6 GHz (e.g., hereinafter "sub-6 GHz") technology to facilitate better connection and more efficient data transfer between electronic devices.

Such radio frequency systems may emit energy in the form of radio waves (e.g., wireless signals) to facilitate data transfer. In some instances, the emitted energy may be absorbed by an object (e.g., a human body) that is within proximity to the radio frequency system. The rate at which the emitted energy may be absorbed is regulated by a Maximum Permissible Exposure (MPE) limit for 5G NR mmWave systems and by a Specific Absorption Rate (SAR) set for sub-6 GHz systems. In particular, for mmWave technologies, the wavelength of the radio frequency waves is small enough for the human body to be considered as part of a far-field of the electronic device and thus, MPE (e.g., electromagnetic field incident on an object's surface, such as human skin, in Watts/meter$^2$) may be used as an appropriate limit for emitted energy absorbed by an object. On the other hand, for sub-6 GHz technology, the wavelength of the radio frequency waves used is larger compared to that of the mmWave radio frequency waves and thus, the human body may be considered as part of a near-field of the electronic device. In such embodiments, the SAR (e.g., electromagnetic field through a volume, such as human tissue, or power absorbed per mass of volume in Watts/kilogram) may provide a better comparison limit for emitted energy absorbed by an object.

To comply with the MPE or SAR, the radio frequency system may output lower than maximum output energy (e.g., output power) when the human body is near the electronic device, such as a hand-held device. It should be noted that while this disclosure contemplates compliance with the MPE or SAR for nearby human bodies, any object or number of objects that may absorb emitted radio wave energy may be considered. Further, it should be appreciated that the following techniques may be applicable to any mmWave system architecture.

In some cases, specialized circuitry (e.g., 60 GHz Body Proximity Sensor) may be implemented in the radio frequency system to detect the presence of the nearby human body. However, implementation of such specialized circuitry may be technically challenging and costly. For example, the specialized circuitry may not be compatible with the mmWave circuitry and the specialized circuitry may increase silicon area consumed per radio frequency system chip.

Thus, in many instances, the radio frequency system may not have the capability for detecting the presence of the nearby human body. This may result in the radio frequency system outputting lower than maximum output power during all operating (e.g., online) times to ensure compliance with the MPE or SAR at all times. However, outputting wireless signals with lower than maximum output power during online operation may reduce the performance of the radio frequency system. Accordingly, the present disclosure provides systems and techniques for detecting the presence of the nearby human body and modifying system operations to comply with the MPE for mmWave and the SAR for sub-6 GHz systems without compromising system performance.

In particular, the hardware of the radio frequency system may be implemented to detect the presence of the nearby human body. In some embodiments, the radio frequency system may employ hardware tailored to better suit wireless transmission via mmWave communication technology, such as the 5G NR mmWave technology. As an example, an electronic device using 5G wireless technology may employ multiple transmission (TX) paths (e.g., chains), multiple reception (RX) paths, and multiple antenna elements. The TX paths, RX paths, and antenna elements may be divided into groups (e.g., quads) that together form a phased array antenna to transmit and/or receive wireless signals via particular signal polarizations and via beams. The beams may communicate information in a particular direction while reducing data loss that may occur over the air at 5G frequencies.

With the foregoing in mind, in some embodiments, the hardware of the radio frequency system may be implemented as a bi-static radar. One or more TX paths within a first quad may transmit a 5G NR signal of a first polarization to an environment external to the electronic device. One or more RX paths within a second quad may detect a reflection of the transmitted 5G NR signal using a second polarization. The reflected 5G NR signal may be generated when the transmitted 5G NR signal is reflected off of the nearby human body. The radio frequency system may perform a cross-correlation measurement of the transmitted 5G NR signal and the reflected NR signal to determine whether the human body is within proximity to the electronic device. Based on the cross-correlation measurement, the radio frequency system may reduce emitted output power to comply with the MPE or the SAR when the human body is detected nearby.

Further, in some embodiments, the hardware of the radio frequency system may be implemented as a mono-static radar. For example, the mono-static radar may transmit the 5G NR signal and receive the reflected 5G NR signal using a single transmitting/receiving quad and polarization. The mono-static radar may include a bi-directional coupler in the TX path of the single quad as well as envelope detectors associated with each of the TX paths of the single quad. The bi-directional coupler and envelope detectors may facilitate detection of the reflected 5G NR signal. The radio frequency system may analyze the phase delay difference between the transmitted 5G NR signal and the reflected 5G NR signal. The radio frequency system may subsequently perform a cross-correlation on the transmitted 5G NR signal and the reflected 5G NR signal to determine the presence of the nearby human body. Based on the cross-correlation measurement, the radio frequency system may reduce emitted output power to comply with the MPE or the SAR when the human body is detected nearby.

Additionally or alternatively, in some embodiments, the hardware of the radio frequency system may be implemented as a Body Detection Sensor operating in the 24 giga-hertz (GHz) industrial, scientific, medical (ISM) band (e.g., 24-24.25 GHz). Using either multiple quads and polarizations or a single quad and polarization, the 24 GHz sensor may transmit a chirp (e.g., non-5G NR impulse response) signal via the 24 GHz ISM band and may detect a reflection of the transmitted chirp signal. Further, the radio frequency system may perform a cross-correlation of the transmitted chirp signal and the reflected chirp signal to determine the presence of the nearby human body. Based on the cross-correlation result, the radio frequency system may reduce emitted output power to comply with the MPE or the SAR when the human body is detected nearby. Further, the radio frequency system may using the 24 GHz sensor technique during measurement gaps (e.g., periods during which the electronic device does not have up-link or down-link transmissions scheduled) defined by $3^{rd}$ Generation Partnership Project (3GPP) 5G NR standard. Additional details with regard to the detection of the nearby human body using the embodiments described herein are detailed below with reference to FIGS. 1-9.

As such, an embodiment of an electronic device 10 that includes a radio frequency system 12 is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the radio frequency system 12, one or more input devices 14, local memory 16, a processor core complex 18, one or more main memory storage devices 20, a power source 22, one or more input/output ports 24, and an electronic display 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 16 and a main memory storage device 20 may be included in a single component.

As depicted, the processor core complex 18 is operably coupled with local memory 16 and the main memory storage device 20. Thus, the processor core complex 18 may execute instruction stored in local memory 16 and/or the main memory storage device 20 to perform operations, such as instructing the radio frequency system 12 to communicate with another electronic device and/or a network. As such, the processor core complex 18 may include one or more general purpose microprocessors, one or more application specific processors (ASICs), one or more field programmable logic arrays (FPGAs), or any combination thereof.

In addition to the instructions, the local memory 16 and/or the main memory storage device 20 may store data to be processed by the processor core complex 18. Thus, in some embodiments, the local memory and/or the main memory storage device 20 may include one or more tangible, non-transitory, computer-readable mediums. For example, the local memory 16 may include random access memory (RAM) and the main memory storage device 20 may include read only memory (ROM), rewritable non-volatile memory such as flash memory, hard drives, optical discs, and the like.

As depicted, the processor core complex 18 is also operably coupled with the I/O ports 24. In some embodiments, the I/O ports 24 may enable the electronic device 10 to interface with other electronic devices. For example, a portable storage device may be connected to an I/O port 24, thereby enabling the processor core complex 18 to communicate data with a portable storage device.

Additionally, as depicted, the processor core complex 18 is operably coupled to the power source 22. In some embodiments, the power source 22 may provide power to one or more components in the electronic device 10, such as the processor core complex 18 and/or the radio frequency system 12. Thus, the power source 22 may include any suitable energy source, such as a rechargeable lithium polymer (Li-poly) battery and/or an alternating current (AC) power converter.

Furthermore, as depicted, processor core complex 18 is operably coupled with the input devices 14. In some embodiments, the input device 14 may facilitate user interaction with the electronic device 10, for example, by receiving user inputs. Thus, the input devices 14 may include a button, a keyboard, a mouse, a trackpad, and/or the like. Additionally, in some embodiments, the input devices 14 may include touch-sensing components in the electronic display 26. In such embodiments, the touch-sensing components may receive user inputs by detecting occurrence and/or position of an object touching the surface of the electronic display 26.

In addition to enabling user inputs, the electronic display 26 may display image frames, such as a graphical user interface (GUI) for an operating system, an application interface, a still image, or video content. As depicted, the electronic display 26 is operably coupled to the processor core complex 18. In this manner, the electronic display 26 may display image frames based at least in part on image data received from the processor core complex 18.

As depicted, the processor core complex 18 is also operably coupled with the radio frequency system 12. As described above, the radio frequency system 12 may facilitate wireless communication of data with another electronic device and/or a network. For example, the radio frequency system 12 may enable the electronic device 10 to communicatively couple to a personal area network (PAN), such as a Bluetooth network, a local area network (LAN), such as an 802.11x Wi-Fi network, and/or a wide area network (WAN), such as a fourth-generation wireless technology (4G), 5G, or LTE cellular network. In other words, the radio frequency system 12 may enable wirelessly communicating data using various communication protocols and/or at various output powers (e.g., strength of transmitted analog wireless signals).

As mentioned previously, the radio frequency system 12 may be tailored to better support wireless transmission via certain wireless technologies. In one embodiment, the radio frequency system 12 may include hardware and/or software that supports mmWave communications on high frequency bands (e.g., 10-400 GHz), such as 5G NR mmWave technology or sub-6 GHz technologies. Thus, in some embodiments, the radio frequency system 12 may include one or more antenna elements 28, a mmWave module (e.g., radio frequency integrated circuit (RFIC)) 30 that includes one or more quads 32 associated with the antenna elements 28, and transceiver circuitry (e.g., filters, power dividers, and the like) plus modem 33. The one or more antenna elements 28 may facilitate receiving and/or transmitting wireless signals using the 5G NR mmWave technology.

Further, the radio frequency system 12 may include the mmWave module 30, which in turn includes one or more quads 32 that further facilitate wireless signal transmission and reception. For example, each of the quads 32 may be electrically coupled to one or more antenna elements 28 and may include one or more RX paths and TX paths to form a phased array antenna that transmits and/or receives wireless signals via beams. The beams may be formed by constructive/destructive interference of signals transmitted and/or received by each antenna 28. Additionally, and as discussed in more detail below, the quads 32 may be used to detect the presence of a nearby object, for example, to adjust radio frequency system 12 operations to meet maximum permissible exposure (MPE) for mmWave systems or specific absorption rate (SAR) specifications for sub-6 GHz systems. In particular, the one or more quads 32 may transmit a reference signal to an external environment and may detect a reflection of the reference signal. The radio frequency system 12 may compare a strength of the reference signal and a strength of the reflected signal to determine whether the results of the comparison exceed a comparison threshold that correlates to the specific absorption rate. Based on the determination, the radio frequency system 12 may adjust energy output by the radio frequency system to below the comparison threshold.

Additionally, the radio frequency system 12 may include the transceiver circuitry and modem 33 that further processes the wireless signals to filter noise, amplify signals, and the like. By way of example, the transceiver circuitry and modem 33 may facilitate performing a cross-correlation measurement on a received signal and a transmitted signal.

As described above, the electronic device 10 may be any suitable electronic device. To help illustrate, one example of a suitable electronic device 10, specifically a handheld electronic device 10A, is shown in FIG. 2. In some embodiments, the handheld electronic device 10A may be a portable phone, a media player, a personal data organizer, a handheld game platform, and/or the like. For example, the handheld electronic device 10A may be a smart phone, such as any iPhone® model available from Apple Inc.

As depicted, the handheld electronic device 10A includes an enclosure 34 (e.g., housing). In some embodiments, the enclosure 34 may protect interior components from physical damage and/or shield them from electromagnetic interference. Thus, a radio frequency system 12 (not shown) may also be enclosed within the enclosure 34 and internal to the handheld electronic device 10A. In some examples, the enclosure 34 may operate as part of the one or more antenna elements 28 of the radio frequency system 12.

Additionally, as depicted, the enclosure 34 may surround the electronic display 26. In the depicted embodiment, the electronic display 26 is displaying a graphical user interface (GUI) 36 having an array of icons 38. By way of example, when an icon is selected either by an input device 14 or a touch sensing component of the electronic display 26, an application program may launch.

Furthermore, as depicted, input devices 14 open through the enclosure 34. As described above, the input devices 14 may enable a user to interact with the handheld electronic device 10A. For example, the input devices 14 may enable the user to activate or deactivate the handheld electronic device 10A, navigate a user interface to a home screen, navigate a user interface to a user-configurable application screen, activate a voice-recognition feature, provide volume control, and/or toggle between vibrate and ring modes. As depicted, the I/O ports 24 also open through the enclosure 34. In some embodiments, the I/O ports 24 may include, for example, a multi-function connector port (e.g., Lightning port) to connect to external devices.

Figure 4:
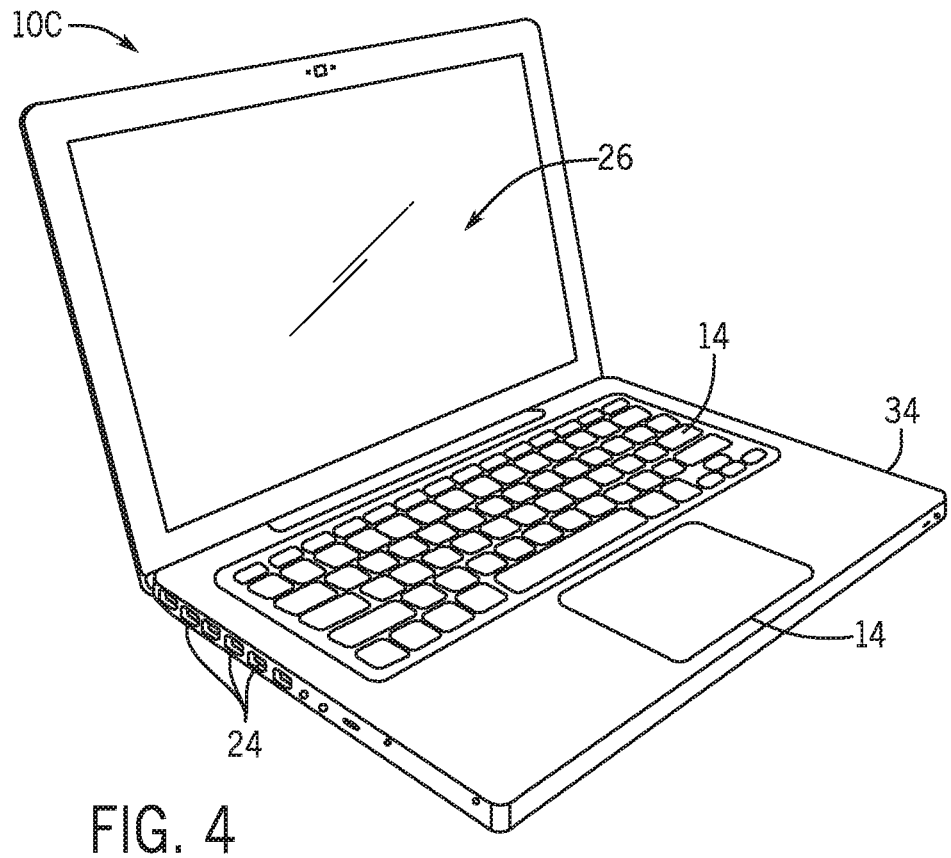
FIG. 4 is a perspective view of a notebook computer representing another example of the electronic device of FIG. 1, in accordance with an embodiment.
Figure 5:
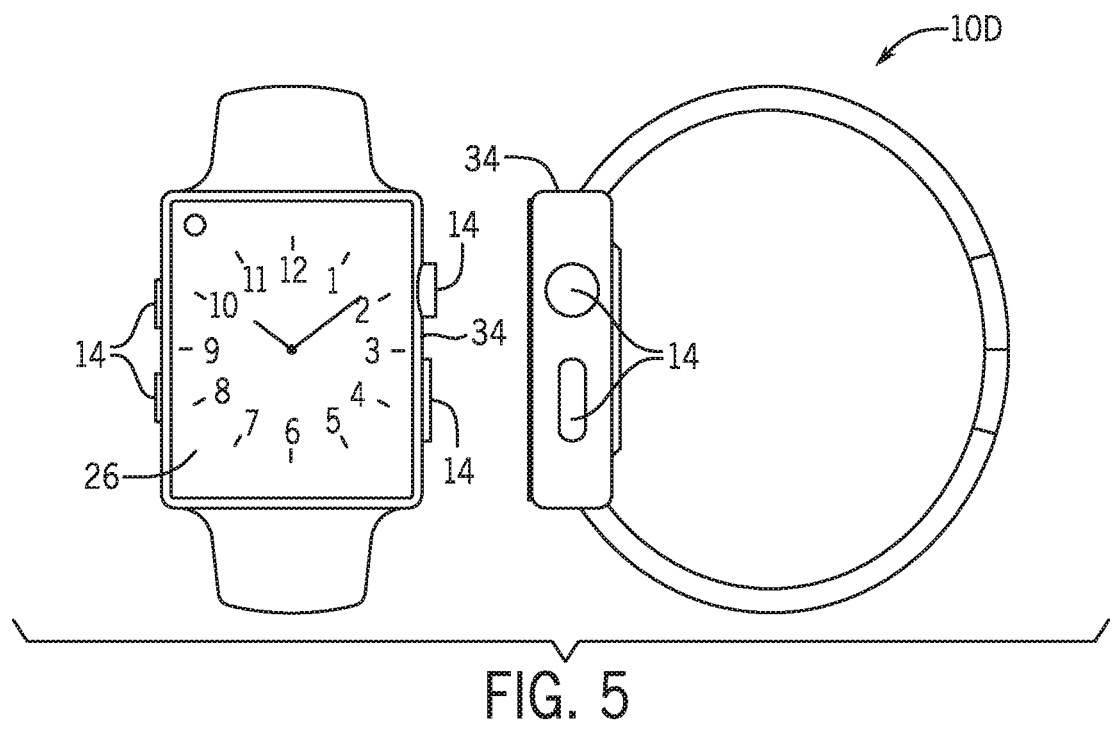
FIG. 5 is a front view of a wearable electronic device representing another example of the electronic device of FIG. 1, in accordance with an embodiment.

To further illustrate, another example of a suitable electronic device 10, specifically a tablet electronic device 10B is shown in FIG. 3. For example, the tablet electronic device 10B may be any iPad® model available from Apple Inc. A further example of a suitable electronic device 10, specifically a computer 10C, is shown in FIG. 4. For example, the computer 10C may be any Macbook® or iMac® model available from Apple Inc. Another example of a suitable electronic device 10, specifically a watch 10D, is shown in FIG. 5. For example, the watch 10D may be any Apple Watch® model available from Apple Inc.

As depicted, the tablet electronic device 10B, the computer 10C, and the watch 10D each also include an electronic display 26, input devices 14, I/O ports 24, and an enclosure 34. Thus, in some embodiments, the enclosure 34 may enclose a radio frequency system 12 in the tablet electronic device 10B, the computer 10C, and/or the watch 10D to facilitate wireless communication of data with other electronic devices and/or a network.

As previously mentioned, the hardware of the radio frequency system 12 may be tailored to support particular wireless technologies, such as mmWave communication technology. In some embodiments, the radio frequency system 12 may implement phased array antenna(s), which includes multiple antenna elements and multiple quads of TX paths and RX paths. Such hardware may facilitate transmission and/or reception of wireless signals according to mmWave communication technology. To ensure compliance with the MPE or the SAR without compromising on the performance of the radio frequency system 12, this hardware may be implemented as a radar/sensor that may detect the presence of the nearby human body in a cost-effective and easily implementable manner.

Figure 6:
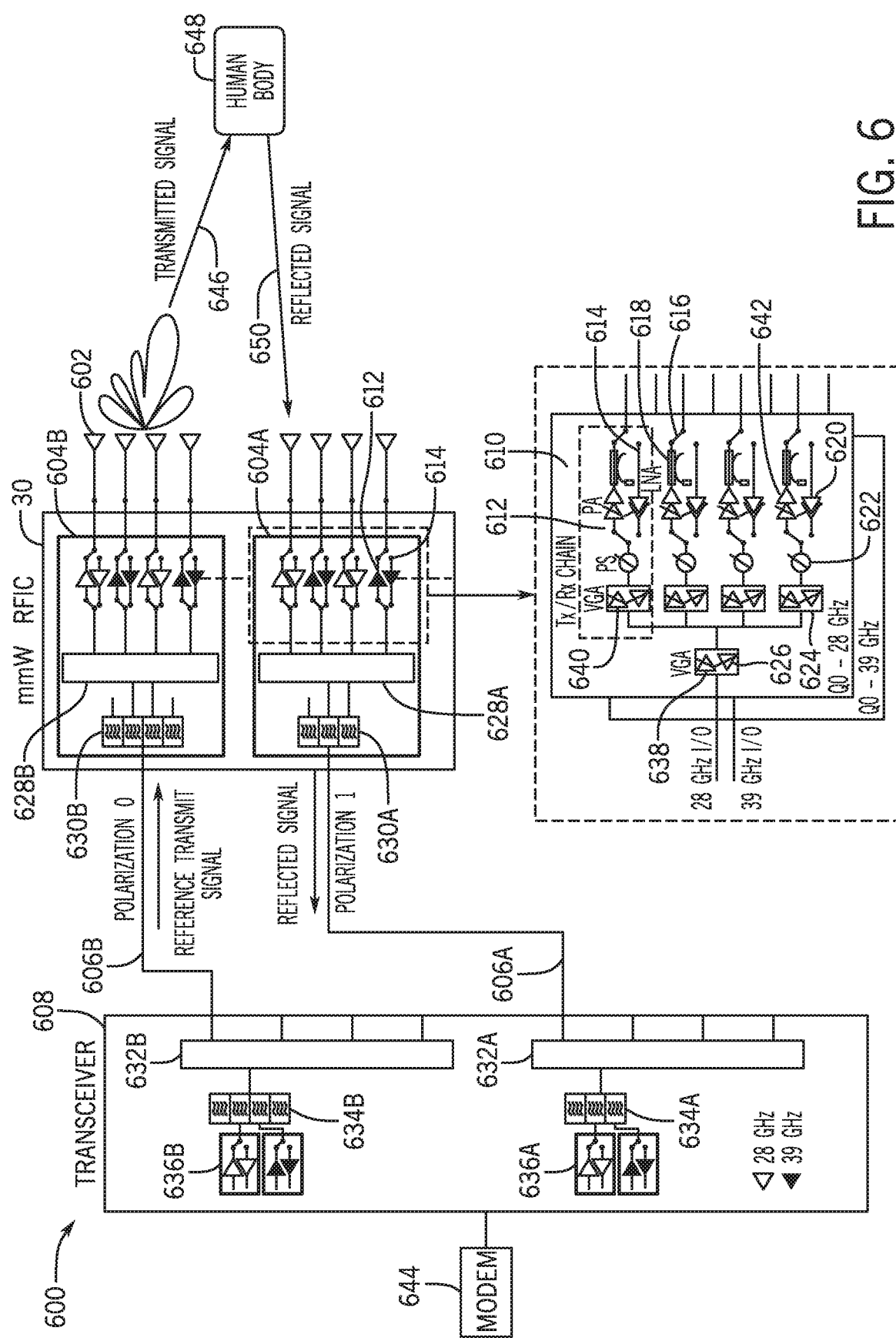
FIG. 6 is a schematic of hardware of the radio frequency system of FIG. 1 implemented as a bi-static radar to detect the presence of a human body, in accordance with an embodiment.

To help illustrate, an example the radio frequency system hardware implemented as a bi-static radar 600 is shown in FIG. 6, in accordance with an embodiment. As depicted, the bi-static radar 600 may include multiple antennas 602, multiple quads 604A-B, one or more cables/traces 606, transceiver circuitry 608, and other radio frequency components used to transmit and/or receive wireless signals. It should be appreciated that the bi-static radar 600 may include a greater or fewer number of radio frequency components than shown.

Briefly, the bi-static radar 600 may include the mmWave module 30 with multiple quads 604A-B that are each coupled to one or more antennas 602 (e.g., the antenna element 28). In particular, each antenna 602 may be coupled to a TX/RX chain pair 610 of the quads 604A-B and may transmit wireless signals to or from the TX/RX chain pair 610. For example, the quad 604B may be coupled to the one or more antennas 602 to form a phased array antenna that transmits wireless signals via beams formed by constructive/destructive interference of signals transmitted by each antenna 602.

Each of the TX/RX chain pair 610 may include a TX path 612 and a RX path 614 that together facilitate transmission and/or reception of wireless signals, such as those communicated between electronic devices 10 using mmWave communication technology or any other suitable communication protocol. The TX path 612 and the RX path 614 may be alternatively coupled to the respective antenna 602 via a switch 616. For example, the switch 616 may couple to the TX path 612 to enable transmission of the wireless signals to the respective antenna 602. Alternatively, in some embodiments, the respective antenna 602 may be coupled directly to a bi-directional coupler 618 in the TX path 612 to enable transmission and reception of the wireless signals.

In some embodiments, the RX path 614 may amplify a received wireless signal using an amplifier 620, such as RX Low-Noise Amplifier (LNA) or a RX variable-gain Low-Noise Amplifier (LNA). The amplifier 620 may amplify an input RX signal received via the respective antenna 602 without degrading signal-to-noise ratio (SNR) of the input RX signal (e.g., amplifies power of both the wireless signal and input noise). The amplified signal may pass through a phase shifter 622 that may modify phase information programmed into the input RX signal during transmission from a different electronic device 10 that generated the input RX signal. The input RX signal may be further amplified by a RX variable-gain amplifier (VGA) 624, for example, to compensate for signal strength loss between the respective antenna 602 and the RX VGA 624.

Each of the RX paths 614 in the quad (e.g., 604A) may subsequently transmit the pre-processed input RX signals to a second VGA 626 coupled to each of the TX/RX chain pairs 610. The second VGA 626 may provide additional amplification of the input RX signal in preparation for further processing by the transceiver 608 and/or the modem 644. Although each of the quads 604A-B are shown to include four TX/RX chain pairs 610 for each frequency band (e.g., 28 GHz, 39 GHz) used by the 5G NR mmWave architecture, a greater or fewer number of TX/RX chain pairs 610 may be included in each quad 604A-B for each of the frequency bands used.

The input RX signal may then be passed to power dividers (e.g., radio frequency splitters 1:2, radio frequency splitters 1:4) 628A and one or more frequency filters 630A, such as a bandpass filter and/or low pass filter. The power dividers 628A and frequency filters 630A may combine filter the input RX signal to facilitate further processing by the radio frequency system 12. Once processed by the mmWave module 30, the input RX signal may be transmitted to the transceiver 608 via traces 606A-B (collectively, "606"), which act as interfaces between the transceiver 608 and the quads 604A-B. The traces 606 may be designated as horizontal polarization traces or vertical polarization traces, such that either horizontal or vertical polarised signals (e.g., electromagnetic waves with the electric field in the horizontal plane or vertical plane, respectively) are picked up and transmitted via the traces 606. For example, the trace 606A may be implemented to transmit signals of polarization 1, such as horizontal polarization, while the trace 606B may be implemented to transmit signals of polarization 0, such as vertical polarization, or vice versa. In some embodiments, the polarization of each trace 606 may be configurable.

The transceiver 608 may include additional radio frequency processing blocks. For example, the traces 606 may transmit the input RX signal to additional power dividers (e.g., 632A) and to an additional set of frequency filters (e.g., 634A) dedicated to processing the input RX signal. Additional TX/RX paths 636A may be coupled to the frequency filters 634A and may transmit the input RX signal for further post-processing. The additional TX/RX paths 636A may be implemented to transmit signals of a particular frequency band (e.g., 28 GHz, 39 GHz). It should be appreciated that the radio frequency processing blocks may include other varieties of processing circuitry, such as a down-converter.

In addition to receiving wireless signals, the radio frequency system 12 may also transmit wireless signals to other electronic devices. As an example, the modem 644 may generate a reference output TX signal that is pre-processed by processing blocks of the transceiver 608, such as a digital pre-distortion processing block, filters 634B, and power dividers 632B. The output TX signal may be subsequently transmitted to the mmWave module 30 via the trace (e.g., 608B) coupled to the transmitting quad (e.g., 604B).

The mmWave module 30 may perform additional filtering and power splitting operations via the filters 630B and the power dividers 628B. Further, based on the frequency of the output TX signal, the output TX signal may be transmitted to an appropriate second VGA 638 of the mmWave module 30 for amplification before processing by the TX path 612. Once amplified, the output TX signal may be further amplified by a TX VGA 640 of the TX path 612 to compensate for expected strength loss from the connections and components of the TX path 612.

The output TX signal may then be modulated (e.g., phase shifted) using the phase shifter 622. The phase shifter 622 may work with other phase shifters of the other TX/RX path pairs 610 to form beams of wireless signals that may be steered in a particular direction, such as towards another electronic device 10. Although a single phase shifter 622 is shown for both the TX path 612 and the RX path 614, it should be appreciated that each TX path 612 and RX path 614 may include their own dedicated phase shifter 622.

Prior to transmission of the output TX signal to the external environment, a power amplifier 642 may amplify the output TX signal to ensure that the output TX signal has sufficient range, for example, to reach the target electronic device 10. Once amplified, the output TX signal may be transmitted to the respective antenna 602, either through the switch 616 or through the bi-directional coupler 618.

As previously discussed, the hardware may be implemented as the bi-static radar 600 to detect the presence of objects (e.g., a human body) near the electronic device 10. In particular, the bi-static radar 600 may use a first quad (e.g., 604B) to transmit the reference output TX signal as a beam to the external environment. In particular, one or more TX paths 612 of the first quad (e.g., 604B) may process and transmit a 5G NR signal (e.g., TX 5G NR signal) generated by the modem 644. The TX 5G NR signal 646 may be generated with a frequency allocated to the 5G NR protocol. For example, the TX 5G NR signal 646 may be of a 28 GHz frequency band (e.g., 5G NR band n257, n258, n261) or of a 39 GHz (e.g., 5G NR band n260) frequency band, in accordance with the 3GPP protocol for Discrete Fourier Transform-spread-Orthogonal Frequency Division Multiplexing (DFT-s-OFDM) or Cyclic-Prefix OFDM (CP-OFDM). This may ensure that the bi-static radar 600 may function without affecting regular 5G NR cellular communications. Additionally, the TX 5G NR signal 646 may be of a first polarization, such as the horizontal polarization of trace 606B.

When the object, such as a human body 648, is within proximity to the radio frequency system 12, the TX 5G NR signal 6464 may be reflected back by the human body 648. Generally, the larger the object, the greater the strength of the reflected signal. Further, the closer the object to the radio frequency system 12, the greater the strength of the reflected signal.

A second quad (e.g., 604A) may receive the reflected 5G NR signal (e.g., RX 5G NR signal) 650. In particular, the one or more RX paths 614 of the second quad (e.g., 604A) may receive the RX 5G NR signal 650 via the first polarization. However, the one or more RX paths 614 may transmit the RX 5G NR signal 650 back to the transceiver 608 using a second polarization, such as the vertical polarization of trace 606A.

Once the RX 5G NR signal 650 has been received by the transceiver 608, the transceiver 608 may transmit the RX 5G NR signal 650 to the modem 644. The modem 644 may perform a post-processing comparison between the TX 5G NR signal 646 it previously generated and the received RX 5G NR signal 650. The comparison may involve performing a cross-correlation of the RX 5G NR signal 650 and the TX 5G NR signal 646, which may generate a spectrum that reveals whether an object is present near the radio frequency system 12. For example, close and narrow peak(s) may reveal that the object is within proximity. In other words, the object is within an unacceptable distance threshold for the amount of output power being emitted by the radio frequency system 12. In some embodiments, the distance threshold for the amount of output power may be determined based on the MPE or the SAR. Once the radio frequency system 12 determines that an object is within proximity, the radio frequency system 12 may adjust output power to comply with the MPE or the SAR specifications (e.g., reduce output power to meet an energy absorption threshold).

By implementing the hardware as the bi-static radar 600, this technique for detecting the presence of the object may have better dynamic range. In particular, the RX paths 614 used to detect the RX 5G NR signal 650 may have enhanced signal sensitivity without using additional amplifiers and thus, increased ability to detect the RX 5G NR signal 650, even if the RX 5G NR signal 650 is relatively weak (e.g., due to reflection off of a relatively distant object). Further, the detection sensitivity may be increased when multiple RX paths 614 are used to detect the RX 5G NR signal 650. Additionally, to increase signal-to-noise ratio (SNR) of the RX 5G NR signal 650 and the TX 5G NR signal 646, all of the available TX paths 612 and the RX paths 614 may be used to transmit and receive the 5G NR signal.

Figure 7:
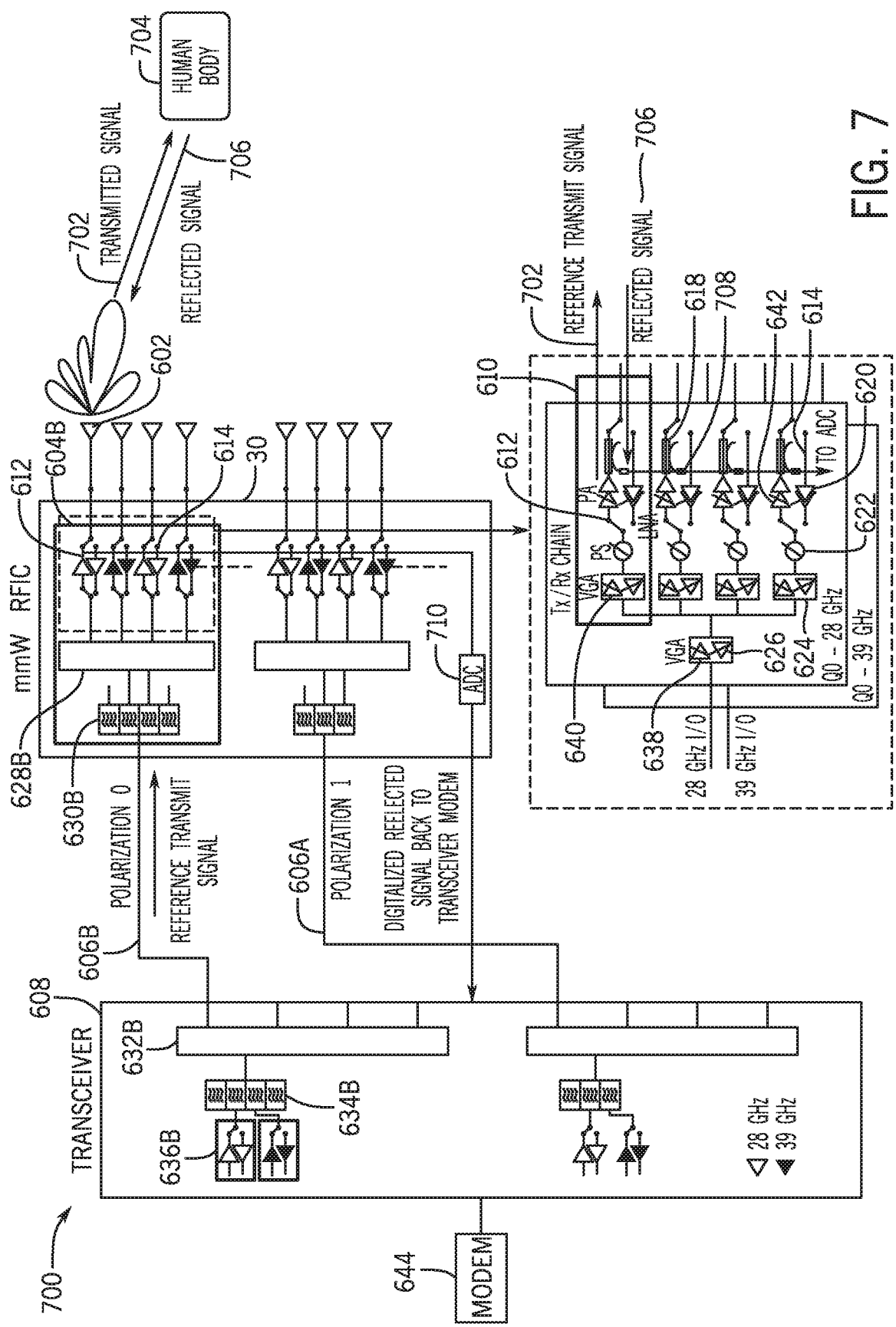
FIG. 7 is a schematic of the hardware of the radio frequency system of FIG. 1 implemented as a mono-static radar to detect presence of the human body, in accordance with an embodiment.

The radio frequency hardware may be additionally or alternatively implemented as a mono-static radar 700 that may detect the presence of the nearby object, as shown in FIG. 7 in accordance with an embodiment. The hardware of the mono-static radar 700 may have similar functionality as the hardware of the bi-static radar 600. For example, the multiple RX paths 614 and multiple TX paths 612 of the mmWave module 30 may facilitate transmission and reception of wireless signals, the transceiver 608 may perform processing operations on the transmitted and received signals, and the modem 644 may compare the transmitted and received signals to detect nearby objects.

However, the mono-static radar 700 may operate in a different manner than the bi-static radar 600. In particular, the mono-static radar 700 may use a single quad (e.g., 604B), rather than multiple quads 604A-B, to determine the presence of the nearby human body. For example, one or more TX paths 612 of the single quad (e.g., 604B) may process and transmit a 5G NR signal (e.g., TX 5G NR signal) 702 generated by the modem 644 and of a frequency allocated to the 5G NR protocol. For example, the TX 5G NR signal 702 may be of a 28 GHz frequency band (e.g., 5G NR band n257, n258, n261) or of a 39 GHz (e.g., 5G NR band n260) frequency band, in accordance with the 3GPP protocol for DFT-s-OFDM or CP-OFDM. This may ensure that the mono-static radar 700 may function without affecting regular 5G NR cellular communications. Additionally, the TX 5G NR signal 702 may be polarized, such as the horizontal polarization of trace 606B.

The TX 5G NR signal 702 may be transmitted to the respective antenna 602 via the bi-directional coupler 618 and eventually to the external environment by the respective antenna 602. When the external environment includes an object, such as a human body 704, near the radio frequency system 12, the TX 5G NR signal 702 may be reflected by the human body 704.

The reflected 5G NR signal (e.g., RX 5G NR signal) 706 may be detected by the antenna element 28 (e.g., one or more antennas 602) of the single quad (e.g., 604B). During detection of the RX 5G NR signal 706, the one or more antennas 602 may be coupled to the TX path 612. In some embodiments, to transmit the RX 5G NR signal 706 to the transceiver 608 and the modem 644 using the same transmitting polarization, the mono-static radar 700 may use the bi-directional coupler 618 in each of the TX path 612, the envelope detector(s) 708, and the ADC 710.

In particular, the bi-directional coupler 618 may be coupled to a respective envelope detector 708 associated with a respective TX path 612. The bi-directional coupler 618 of a receiving RX path 614 may transfer a portion of the RX 5G NR signal 706 to the envelope detector 708. The bandwidth of the envelope detector 708 may allow the envelope detector 708 to recover an envelope signal of the RX 5G NR signal 706 as opposed to other signal recover detectors, such as root-mean-square (RMS) detectors. The envelope detector 708 may be coupled to the ADC 710, which may generate a digital representation of the RX envelope signal. Once digitized, the digital representation may be transmitted to the transceiver 608 and to the modem 644 for post-processing.

As previously described, the modem 644 may perform a post-processing comparison between the TX 5G NR signal 702 and the RX 5G NR signal 706. In particular, the modem 644 may have the TX 5G NR signal 702 stored from the generation of the TX 5G NR signal 702 and may also receive the digitized RX envelope signal. Additionally or alternatively, the modem 644 may also receive a digitized TX envelope signal that is generated in a similar manner at the digitized RX envelope signal. The modem 644 may subsequently determine a phase difference (e.g., delay between the TX envelope signal and the RX envelope signal) between the digitized envelope signals and may perform a cross-correlation on the digitized envelope signals. The cross-correlation may generate a spectrum that may reveal whether the object is present near the radio frequency system 12. For example, close and narrow peak(s) may reveal that the object is within proximity. In other words, the object is within an unacceptable distance threshold for the amount of output power being emitted by the radio frequency system 12. In some embodiments, the distance threshold for the amount of output power may be determined based on the MPE or the SAR. Once the radio frequency system 12 determines that an object is within proximity, the radio frequency system 12 may adjust output power to comply with the MPE or the SAR specifications (e.g., reduce output power).

By implementing the hardware as the mono-static radar 700, this technique for detecting the presence of the object may be independent of polarization effects on the TX 5G NR signal 702 and the RX 5G NR signal 706 since only a single quad (e.g., 604B) and a single polarized trace (e.g., 606B) are used. Further, to increase signal-to-noise ratio (SNR) of the TX 5G NR signal 702 and the RX 5G NR signal 706, multiple TX paths 612 and RX paths 610 may be used to transmit and receive the 5G NR signal. Furthermore, the bi-directional coupler 618, envelope detector 708, and ADC 710 may enable measurement of both the TX 5G NR signal 702 and the RX 5G NR signal 706 without relying on use of the RX paths 614.

Figure 8:
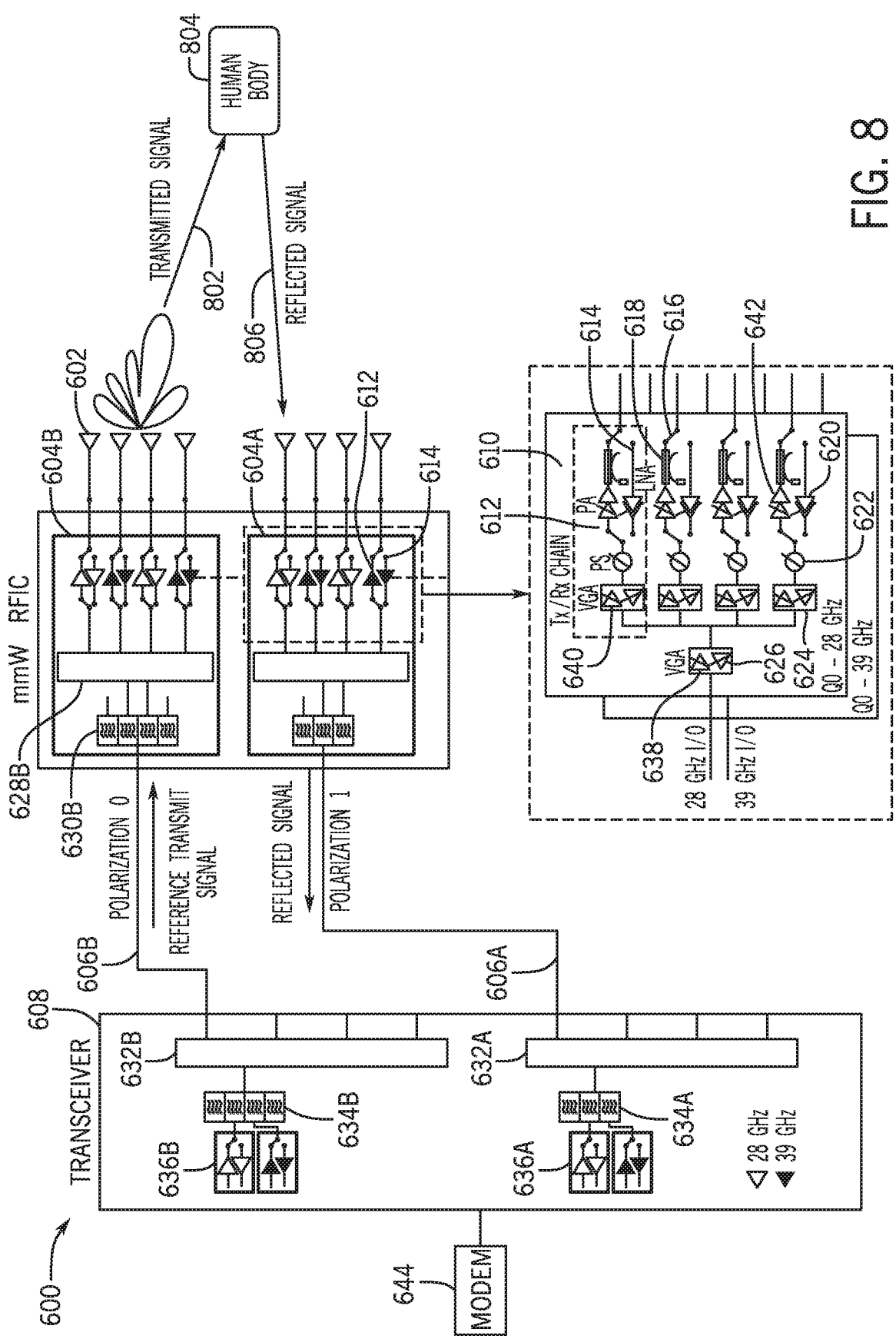
FIG. 8 is a schematic of the hardware of the radio frequency system of FIG. 1 implemented as a Body Detection Sensor operating in the 24 giga-hertz (GHz) band to detect the presence of the human body, in accordance with an embodiment.

Additionally or alternatively, the hardware of the radio frequency system 12 may be implemented as a specialized Body Detection Sensor operating in the 24 giga-hertz (GHz) band (e.g., 24 GHz sensor) 800, as shown in FIG. 8 in accordance with an embodiment. The hardware of the 24 GHz sensor 800 may have similar functionality as the hardware of the bi-static radar 600. For example, the multiple RX paths 614 and multiple TX paths 612 of two quads 604A-B in the mmWave module 30 may facilitate transmission and reception of wireless signals. Further, the transceiver 608 may perform processing operations the transmitted and received signals, and the modem 644 may compare the transmitted and received signals to detect nearby objects.

However, the 24 GHz sensor 800 may operate using a chirp signal rather than a 5G NR signal. In particular, the mmWave module 30 and the antennas 602 may include circuitry that can transmit, receive, and process wireless signals between the frequencies 24 to 24.25 GHz. The modem 644 may generate a chirp signal (e.g., non-5G NR impulse response signal) that may be transmitted to a first quad (e.g., 604B) using a first polarization and subsequently to the external environment. The chirp signal may be transmitted during measurement gaps (e.g., 10-80 ms gap during which an electronic device 10 is not transmitting or receiving communication) defined by the 3GPP 5G NR standard.

The transmitted chirp signal 802 may be reflected off of a nearby object, such as a human body 804. The reflected chirp signal 806 may be received by one or more TX paths 164 of the second quad (e.g., 604A), which may be subsequently relayed back to the transceiver 608 and to the modem 644 using a second polarization. As previously described, the modem 644 may perform a post-processing comparison between the TX chirp signal 802 and the RX chirp signal 806. In particular, the modem 644 may perform a cross-correlation of the digitized TX envelope signal and the digitized RX envelope signal. The cross-correlation may yield a spectrum that reveals whether the object is present near the radio frequency system 12. For example, close and narrow peak(s) may reveal that the object is within proximity. In other words, the object is within an unacceptable distance threshold for the amount of output power being emitted by the radio frequency system 12. In some embodiments, the distance threshold for the amount of output power may be determined based on the MPE or the SAR. Once the radio frequency system 12 determines that an object is within proximity, the radio frequency system 12 may adjust output power to comply with the MPE or the SAR specifications (e.g., reduce output power).

By implementing the hardware as the 24 GHz sensor 800, this technique may enable flexibility in detecting the presence of the object. For example, a chirp signal used in industrial radar applications may be used instead of a 5G NR signal due to the use of a 24 GHz band outside of the 5G radio bands. Thus, this technique may also be compatible with sub-6 GHz technologies. Additionally, because the chirp signal may be transmitted during measurement gaps defined by the 3GPP 5G NR standard, this technique may not affect the 5G NR cellular communications.

Further, it should be appreciated that the 24 GHz sensor 800 may operate in a manner similar to that of the mono-static radar 700. For example, the 24 GHz sensor 800 may use a single quad (e.g., 604B) and single polarization to transmit and receive the chirp signal. The 24 GHz sensor 800 may also use the bi-directional coupler 618, the envelope detectors 708, and the ADC 710 to transmit digitized, envelope signals of the transmitted and reflected chirp signals to the modem 644. By implementing the 24 GHz sensor 800 in a manner similar to that of the mono-static radar 700, the technique may be independent of polarization effects on the transmitted and reflected chirp signals.

Figure 9:
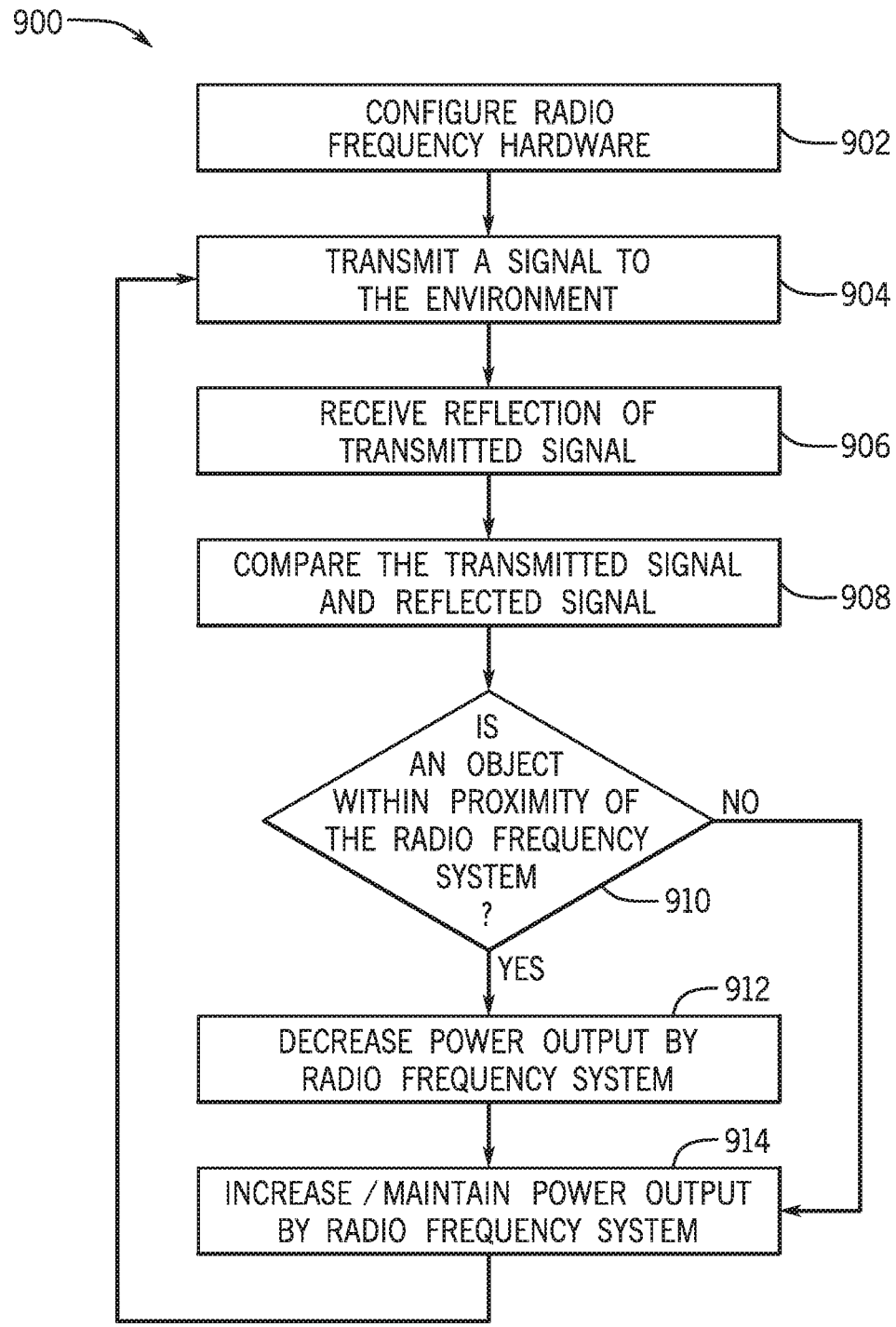
FIG. 9 is a flow chart of a process for adjusting operations of the radio frequency system of FIG. 1 based at least in part on the detection of the human body by the radio frequency system of FIG. 1, in accordance with an embodiment.

A process 900 for adjusting operations of the radio frequency system 12 based at least in part on the detection of the object is described in FIG. 9, in accordance with an embodiment. While process 900 is described according to a certain sequence, it should be understood that the present disclosure contemplates that the described steps may be performed in different sequences than the sequence illustrated, and certain described steps may be skipped or not performed altogether. In some embodiments, the process 900 may be implemented at least in part by executing instructions stored in a tangible, non-transitory, computer-readable medium, such as the memory 20, using processing circuitry, such as the processor core complex 18 or a separate controller designated for the radio frequency system. Additionally or alternatively, the process 900 may be implemented at least in part by circuit connections and/or control logic implemented in an electronic device 10.

Generally, the process 900 may be initiated by configuring the radio frequency hardware as a bi-static radar 600, a mono-static radar 700, or a 24 GHz sensor 800 (process block 902). In particular, the processor core complex 18 may instruct the mmWave RFIC hardware to use a single quad (e.g., 604A) or multiple quads 604A-B implement either the radar configuration or the sensor configuration. The processor core complex 18 may instruct the mmWave module 30 hardware to use a single quad (e.g., 604A) or multiple quads 604A-B. The processor core complex 18 may then instruct the radio frequency system 12 to transmit the selected signal to the external environment (process block 904). For example, one or more of the TX paths 612 may process and transmit the selected signal. The radio frequency system 12 may subsequently receive a reflection of the transmitted signal when the transmitted signal is reflected of the nearby object (process core complex 906).

Furthermore, the processor core complex 18 may instruct the modem 644 to perform a comparison between the transmitted signal and the reflected signal (process block 908). For example, the modem 644 may perform the cross-correlation measurement on the transmitted signal and the reflected signal. Once the comparison is complete, the electronic device 10 may determine whether the object is within proximity of the radio frequency system 12 (decision block 910). That is, the spectrum generated from the cross-correlation measurement may be used to determine whether the object is nearby. The cross-correlation measurements may be compared to a comparison threshold correlated to the MPE or the SAR specifications. When it is determined that the object is nearby (e.g., the comparison results exceed the comparison threshold), the power output by the radio frequency system 12 may be decreased to meet the MPE or the SAR (process block 912). If the object is not within proximity, then the radio frequency system 12 may increase or maintain the power output of the radio frequency system 12 (process block 914).

By employing the techniques described above, the radio frequency system 12 may detect the presence of the nearby object and adjust system 12 operations to meet the MPE for mmWave operations or the SAR for the sub-6 GHz operations. Further, the present techniques provide object detection using existing radio frequency circuitry rather via dedicated radar circuitry (e.g., 60 GHz body proximity sensor radar) which may increase silicon area if integrated in the radio frequency circuitry. Additionally, the present techniques provide flexibility in the dynamic range offered during detection by varying the number of TX paths 612 and/or RX paths 614 used to transmit and receive the signals, respectively.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising a millimeter wave radio frequency system configured to wirelessly transmit and receive data over a millimeter wave frequency, wherein the millimeter wave radio frequency system comprises:
    a first group of a plurality of transmission paths and corresponding plurality of antennas, wherein the first group is configured to form a first phased array antenna to transmit the data from the electronic device over the millimeter wave frequency;
    a second group of a plurality of receiving paths and corresponding plurality of antennas, wherein the second group is configured to form a second phased array antenna to receive the data, wherein one or more of the plurality of transmission paths and the corresponding plurality of antennas are configured to provide a reference signal and one or more of the plurality of receiving paths and the corresponding plurality of antennas are configured to receive a reflection signal based on the reference signal;
    a processor configured to instruct the millimeter wave radio frequency system to:
        perform a comparison between the reference signal and the reflection signal;
        determine whether an object is in proximity to the electronic device based at least in part on whether results of the comparison exceed a comparison threshold, wherein the results of the comparison are correlated to energy absorbed by the object; and
        in response to determining that the result exceeds the comparison threshold, decrease power output by the millimeter wave radio frequency system below the comparison threshold.

2. The electronic device of claim 1, wherein the second group comprises one or more additional transmission paths configured to process and transmit signals generated by the millimeter wave radio frequency system, and wherein the millimeter wave radio frequency system comprises a switch configured to control whether the second group receives the signals or transmits the signals.

3. The electronic device of claim 1, wherein the plurality of transmission paths are configured to transmit the reference signal via a first polarization, and wherein the plurality of receiving paths are configured to receive the reflection signal via a second polarization.

4. The electronic device of claim 1, wherein the reference signal is a fifth-generation new radio millimeter wave (5G NR mmWave) signal.

5. The electronic device of claim 1, wherein the reference signal is a chirp signal comprising industrial radar waveforms, the chirp signal sent during a measurement gap of communicating fifth-generation new radio millimeter wave signals, wherein the millimeter wave radio frequency system is configured to transmit the chirp signal using a 24 gigahertz (GHz) industrial, scientific, and medical (ISM) band.

6. The electronic device of claim 1, comprising a modem coupled to the first group and the second group, wherein the modem is configured to perform the comparison between the reference signal and the reflection signal.

7. The electronic device of claim 6, wherein the comparison comprises a cross-correlation measurement of the reference signal and the reflection signal.

8. The electronic device of claim 1, wherein in response to determining that the results are below the comparison threshold, maintaining or increasing power output by the millimeter wave radio frequency system.

9. The electronic device of claim 1, wherein the comparison threshold is based at least in part on a maximum permissible exposure (MPE) specification for millimeter wave (mmWave) systems, specific absorption rate (SAR) specification for sub-6 GHz systems, or a combination thereof.

10. The electronic device of claim 1, wherein the first group and the second group are part of a common group comprising a bidirectional coupler.

11. The electronic device of claim 1, wherein performing the comparison comprises determining a phase delay difference between the reference signal and the reflection signal.

12. A circuit, comprising:
   a plurality of antennas configured to transmit and receive wireless signals over a millimeter wave frequency;
   a plurality of transmission paths coupled to the plurality of antennas to form a first phased array antenna to transmit data over the millimeter wave frequency, wherein the plurality of transmission paths are configured to:
      process a reference signal of a selected polarization; and
      transmit the reference signal from an electronic device comprising the circuit using the selected polarization; and
   a plurality of receiving paths coupled to the plurality of antennas to form a second phased array antenna to receive data over the millimeter wave frequency, wherein the plurality of receiving paths are configured to receive a reflection signal based on the reference signal using the selected polarization;
   wherein the circuit is configured to:
      determine whether an object is in proximity to the electronic device based at least in part on a comparison between the reference signal and the reflection signal; and
      in response to the object being in proximity to the electronic device, decrease power output by the circuit below an energy absorption threshold.

13. The circuit of claim 12, wherein at least a first portion of the plurality of transmission paths are configurable to transmit the reference signal, and wherein at least a second portion of the plurality of transmission paths are configurable to not transmit the reference signal.

14. The circuit of claim 12, wherein at least a first portion of the plurality of receiving paths are configurable to receive the reflected signal, and wherein at least a second portion of the plurality of receiving paths are configurable to not receive the reflection signal.

15. The circuit of claim 12, wherein each of the plurality of transmission paths comprise a bi-directional coupler coupled directly to the plurality of antennas, and wherein the bi-directional coupler is configured to transmit the reference signal and the reflection signal to one or more envelope detectors.

16. The circuit of claim 15, wherein the one or more envelope detectors are configured to generate an envelope signal for each signal transmitted to the one or more envelope detectors by the bi-directional coupler, and wherein the one or more envelope detectors are coupled to an analog-to-digital converter (ADC) configured to digitize the envelope signals, as digitized envelope signals.

17. The circuit of claim 16, wherein determining whether the object is in proximity to the electronic device comprises comparing the digitized envelope signals of the reflection signal and the digitized envelope signals of the reference signal via cross-correlation.

18. A method, comprising:
   configuring, via a circuit, radio frequency hardware to implement a bi-static configuration or a mono-static configuration, the circuit comprising first group of a plurality of transmission paths and corresponding plurality of transmitting antennas that is configured to form a first phased array antenna to transmit data over a millimeter wave frequency, the circuit comprising a second group of a plurality of receiving paths and corresponding plurality of receiving antennas that is configured to form a second phased array antenna to receive the data over the millimeter wave frequency;
   transmitting, via the circuit, a reference signal over the millimeter wave frequency to an environment external to an electronic device;
   receiving, via the circuit, a reflection signal over the millimeter wave frequency, the reflection signal based on a reflection of the reference signal off an object;
   comparing, via the circuit, the reflection signal and the reference signal;
   determining, via the circuit, whether the object is within a pre-defined proximity to the electronic device;
   in response to the object being within the pre-defined proximity, decreasing power output by the electronic device; and
   in response to the object not being within the pre-defined proximity, increasing the power output by the electronic device.

19. The method of claim 18, wherein the bi-static configuration comprises:
   a first group of the plurality of transmission paths configured to transmit the reference signal to the environment via a first polarization and the corresponding plurality of transmitting antennas; and
   a second group of the plurality of receiving paths configured to receive the reflection signal via a second polarization and the corresponding plurality of receiving antennas;
   wherein the reference signal is a chirp signal comprising a non-fifth-generation new radio millimeter wave (5G NR mmWave) signal.

20. The method of claim 18, wherein the mono-static configuration comprises:
   a radio frequency circuit configured to:
      transmit the reference signal to the environment via a polarization the corresponding plurality of transmitting antennas; and
      receive the reflection signal via the polarization and the corresponding plurality of receiving antennas, wherein the corresponding plurality of transmitting antennas and the corresponding plurality of receiving antennas are part of a common group of antenna elements;
   wherein the reference signal is a fifth-generation new radio millimeter wave (5G NR mmWave) signal, a chirp signal comprising industrial radar waveforms transmitted using a 24 giga-hertz (GHz) industrial, scientific, and medical (ISM) band, or a combination thereof.

* * * * *